Patented Oct. 19, 1948

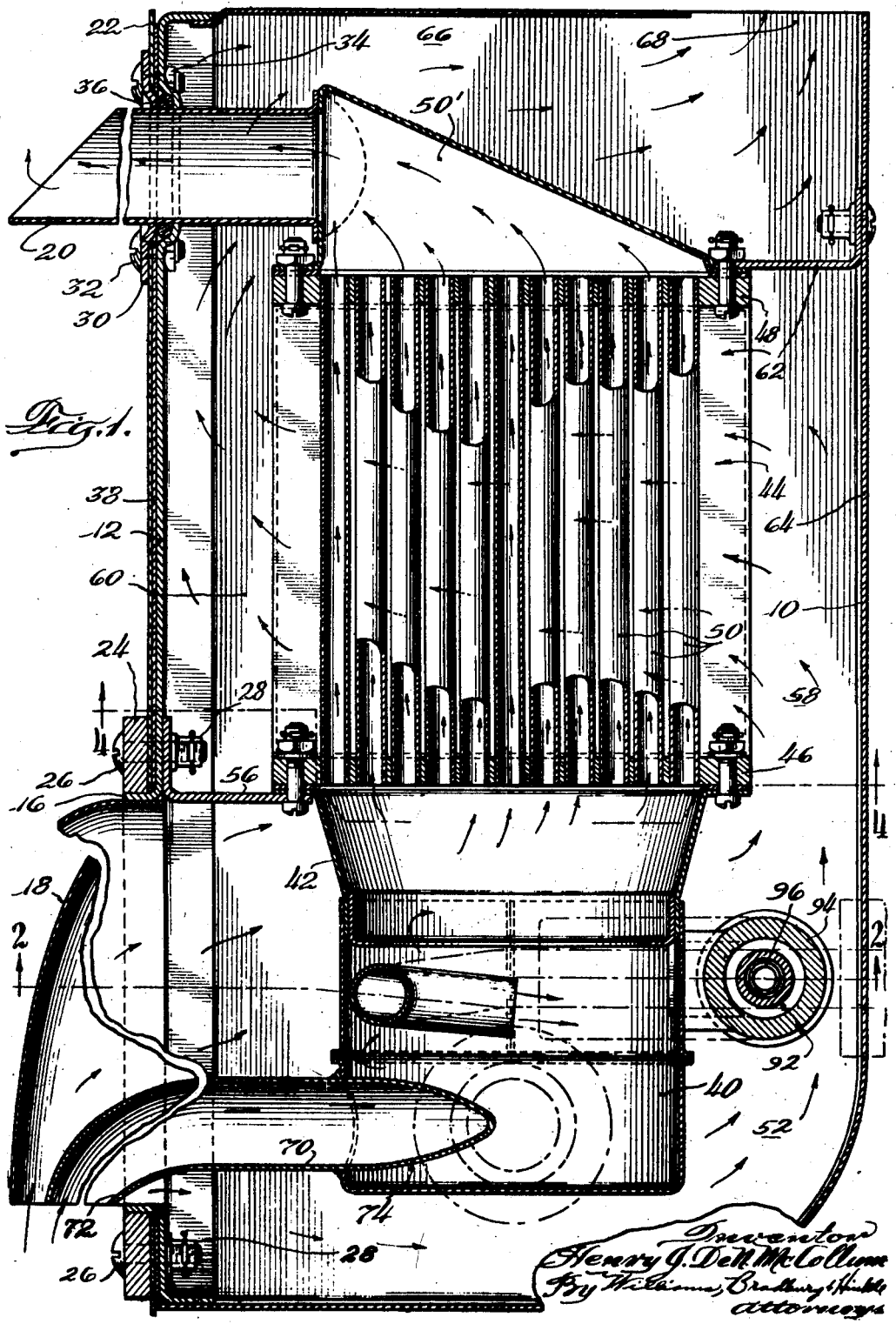

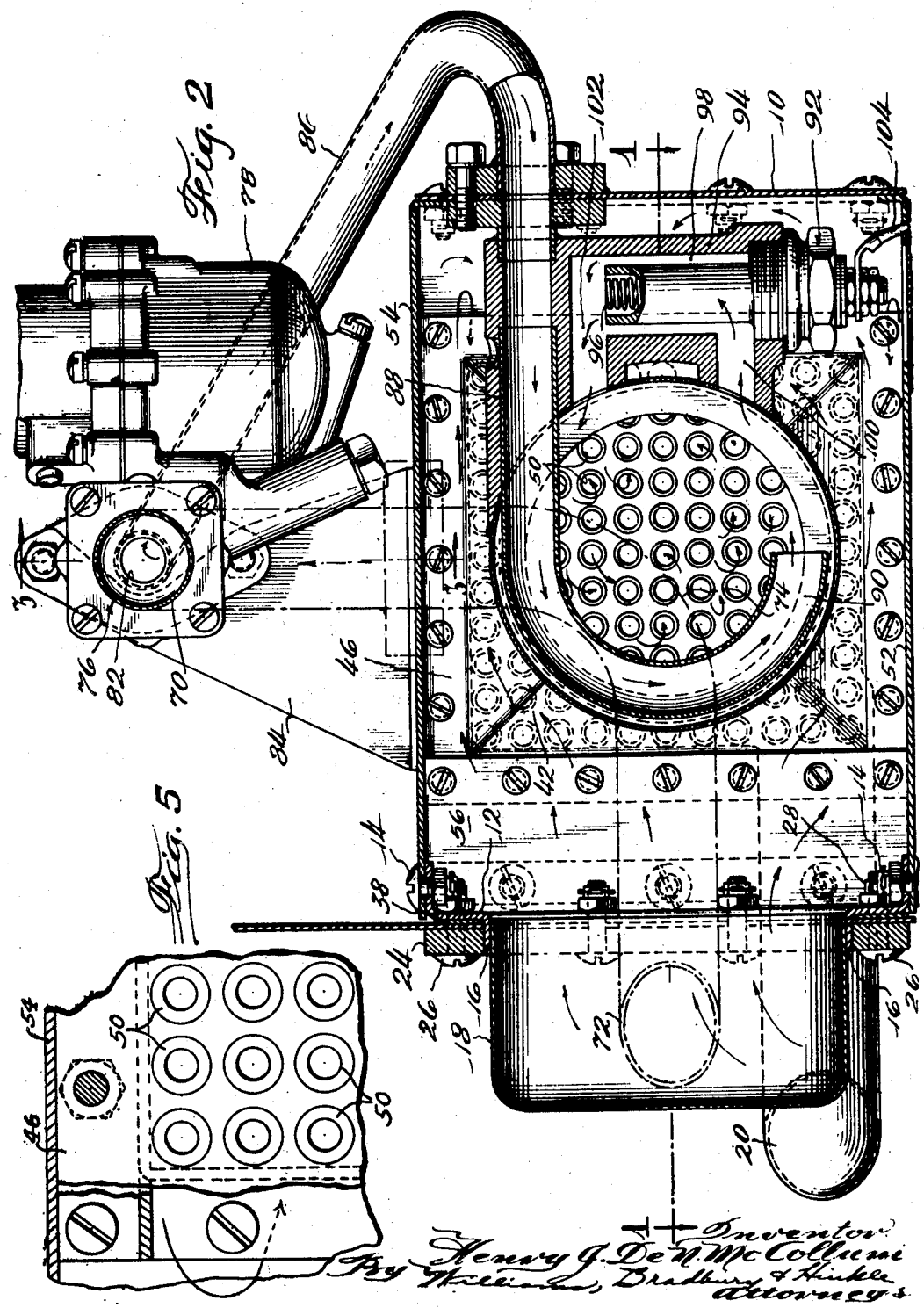

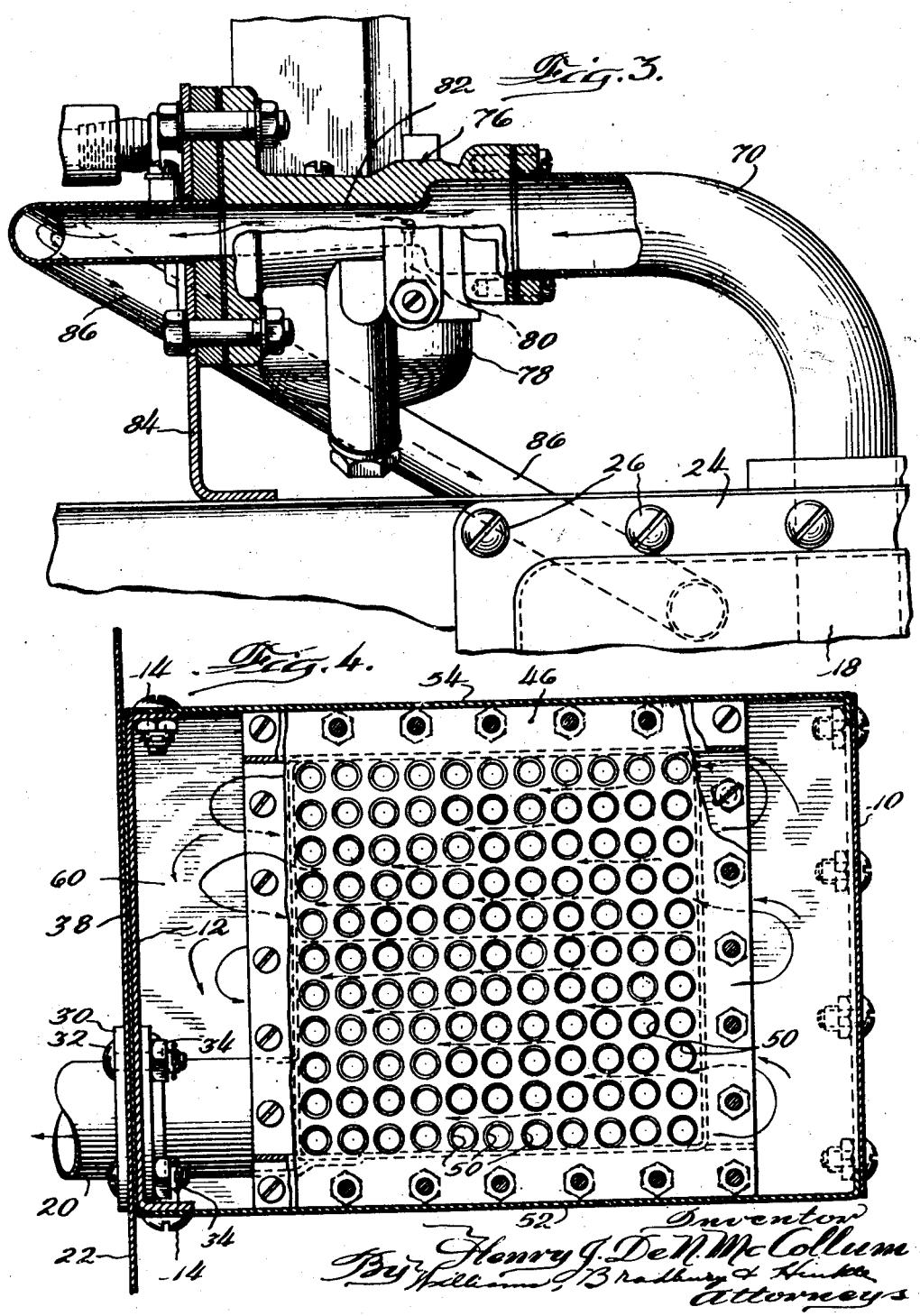

2,451,851

UNITED STATES PATENT OFFICE 2,451,851

INTERNAL-COMBUSTION HEATER FOR HEATING AIR

Henry J. De N. McCollum, Chicago, Ill.; Thelma McCollum, executrix of said Henry J. De N. McCollum, deceased, assignor to Stewart-Warner Corporation, Chicago, Ill., a corporation of Virginia Application January 1, 1944, Serial No. 516,648

6 Claims. (Cl. 126—116)

My invention relates to heat exchangers and more particularly to heat exchangers for internal combustion heaters adapted for use in aircraft and for other similar purposes.

An object of my invention is to provide a new and improved heat exchanger which is more efficient than the heat exchangers of the prior art.

Another object of my invention is to provide a new and improved heat exchanger which requires no secondary air to prevent the heat exchanger from burning out or becoming overheated.

Another object of my invention is to provide a new and improved heat exchanger which can be made with relatively short passages for combustion gases and which is effective to discharge such gases at substantially the temperature of ventilating air flowing over the heat exchanger.

Another object of my invention is to provide a new and improved heat exchanger which absorbs or prevents the creation of objectionable noises and can be used without a muffler in aircraft and similar types of heaters.

Another object of my invention is to provide a new and improved heat exchanger which is easy to fabricate, is light in weight, and extremely compact.

Another object of my invention is to provide a new and improved heat exchanger which is generally rectangular in cross section and which can be built in different sizes without substantial modification for use in heaters having different heat outputs.

Another object of my invention is to provide a new and improved heat exchanger wherein, with a change in the size of the exchanger, the heat exchange rate increases directly as the total inlet area of the air passages at the inlet end of the heat exchanger.

Other objects and advantages will become apparent as the description proceeds.

In the drawings:

Fig. 1 is a longitudinal sectional view of an aircraft heater incorporating a preferred embodiment of my heat exchanger. This view is taken on the line 1—1 of Fig. 2.

Fig. 2 is a transverse slightly irregular section taken on the line 2—2 of Fig. 1.

Fig. 3 is a partial sectional view of the fuel feeding arrangement and is taken on the lines 3—3 of Fig. 2.

Fig. 4 is an irregular transverse sectional view taken on the line 4—4 of Fig. 1; and Fig. 5 is a partial view similar to Fig. 4 but on an enlarged scale and emphasizing the thickness of the tube walls.

The heater shown in the drawings is of the internal combustion type and is particularly adapted for use on aircraft. This heater is designed as a unitary self-contained structure having projecting air inlets and a projecting exhaust connection adapted to extend through openings in the skin of an aircraft or through openings in a panel mounted in the window space or other opening in the wall of an aircraft or other vehicle. The particular heater shown constitutes the subject matter of my Patent No. 2,422,694 granted June 24, 1947 on an application filed January 1, 1944, so that it will suffice herein to describe this heater only in general terms. The heater illustrated in the drawings comprises a box-like housing 10 having as a part thereof a closure 12 secured to the rest of the housing by screws 14 or other suitable fastening means. The closure 12 has an opening formed therein and surrounded by an outwardly projecting flange or lip 16 to which is secured a ventilating air ram 18. The closure 12 has a second opening therein through which an exhaust pipe 20 projects. The closure 12 is attached to a supporting structure 22 such as the skin of an air craft or to a panel adapted to be mounted in a window opening or other opening in the wall of an aircraft or other vehicle. Such mounting is effected by two sets of fastening means, one of which surrounds each of the openings in the closure 12. One of these sets of fastening means includes a ring 24 secured by screws 26 to nuts 28 secured to the inner side of the closure 12. The other of these fastening means comprises a second ring 30 attached by screws 32 to nuts 34 secured to the closure plate 12. A sealing ring 36 is clamped between the ring 30 and closure 12 to form a gastight seal around the exhaust pipe 20. A gasket 38 of asbestos or other suitable material may be interposed between the closure 12 and support 22.

A cylindrical combustion chamber 40 is located in the housing 10 and is secured at one end to a tapered throat 42 leading to a heat exchanger indicated generally by reference character 44. This heat exchanger constitutes the subject matter of my present invention and is hereinafter described in greater detail. For present purposes, it will be sufficient to point out that this heat exchanger comprises headers 46 and 48 connected by tubes 50 through which hot products of combustion flow in passing from the combustion chamber to an exhaust manifold 50' from whence these gases are discharged through the exhaust pipe 20.

The headers 46 and 48 of the heat exchanger are rectangular in shape and extend from wall 52 to wall 54 of the housing 10 (Fig. 4). A partition 56 connects header 46 to closure 12 and directs ventilating air received from ram 18 transversely of the combustion chamber 40, as indicated by arrows in Fig. 1. This air thus flows into the space 58 to the right of the heat exchanger as viewed in this figure, and laterally between in the tubes thereof to the space 60 located to the left of the heat exchanger. This reversal of air flow is made necessary by a partition 62 which connects the header 48 with the housing wall 64 which is opposite the closure 12. The heated ventilating air flows from space 60 into a chamber 66 which surrounds the exhaust manifold 50' and which communicates with the interior of the aircraft cabin or other space to be heated by way of an outlet 68.

A combustion air supply pipe 70 has its inlet or air ram end 72 in the ram 18. This pipe has a curved portion 74 located in the combustion chamber 40 whereby combustion air is heated before delivery to the carburetor 76 to which the other end of this pipe 70 is attached. This carburetor has the usual float bowl 78 which supplies gasoline or other fuel to a jet 80 delivering it into the throat of a Venturi tube 82, wherein the fuel is mixed with air delivered by the pipe 70. The carburetor 76 is mounted on a bracket 84 attached to a wall of the housing 10.

A pipe 86 conveys combustible mixture from the carburetor 76 to an induction tube 88 having a curved end 90 located in the combustion chamber 40. Combustible mixture delivered to the combustion chamber is ignited by an electrical igniter 92 screwed into a casting 94 attached to the cylindrical wall of the combustion chamber. A hot wire 96 of the igniter is located in a pocket 98 communicating with the interior of the combustion chamber by way of passages 100 and 102.

After the heater is installed in the aircraft, an electrical conductor 104 attached to the igniter 92 is plugged or otherwise connected into an electrical circuit of the aircraft or to any other suitable source of current for the gniter 92. The fuel inlet of the carburetor is also connected by suitable piping to a tank or other source of fuel supply for the heater and this source may be one provided exclusively for heating purposes or a source which is common to the heater and other mechanism such, for example, as the aircraft engine. It will be noted that the rams for the ventilating and combustion air and the exhaust outlet have a fixed relationship to each other and that this relationship is not disturbed by attaching the heater to the wall of an aircraft or other supporting structure.

Before describing in detail my new and improved heat exchanger, it will be appropriate to point out some of the problems which are encountered in the design and construction of such a heat exchanger. This heat exchanger is of the primary surface type in which the surface in contact with the air stream is substantially the same as the surface in contact with the gas stream. Such a heat exchanger ordinarily is made of metal which can stand high temperatures but which has low thermal conductivity. Aluminum ordinarily cannot be used for such heat exchangers, because without secondary surfaces such, for example, as fins, to assist in carrying away the heat, the tubes will burn up where subjected to an intense flame as the surface in contact with the ventilating air stream is not great enough as compared with the heated surface.

One of the characteristics of heat exchangers of the type shown in this application is that metals of low thermal conductivity are usually used and the metal sections are as thin as possible. For this reason, the temperature gradient from the end where the intensely hot products of combustion enter to the exhaust end is quite steep if the heat exchanger is at all efficient. In other words, the tubes run red hot at the inlet end and comparatively cool at the outlet end, due to the decrease in gas temperature as the combustion gases lose heat. Also, since the metal of which the tubes are made is thin and has a low rate of thermal conductivity, there is no appreciable quantity of heat distributed longitudinally through the tubes by conduction of the metal, so that heating the tube at one end will have no appreciable effect in raising the temperature of the tube much beyond the point at which such heat is applied.

In aircraft heaters it is essential that the heaters operate at high efficiency and provide a high heat output in a small light weight heater. Such efficiency is only possible where the heat exchanger is exposed to intensely hot flames, so that the inlet header plate used with heat exchangers of this type runs very hot and frequently requires that a portion of the ventilating air stream be directed against the rear surface of the inlet header plate in order to prevent this plate from burning out. In the past, these problems were sought to be met by making heat exchangers of the primary surface type and which are to be exposed to extremely hot products of combustion of metal having a relatively low heat conductivity but having high strength at high temperatures in comparatively thin sections. Such heat exchangers have a tendency to develop local hot spots which frequently result in burning out of the heat exchanger.

The heat exchanger which forms the subject matter of my present invention is a distinct departure from the heat exchangers of the prior art and solves the problems of a highly efficient, compact and light weight aircraft heat exchanger in a novel manner. First, the header plate 46 at the inlet end of the heat exchanger is of thick section. Second, the tubes 50 are of small diameter and are spaced close together. Third, these tubes have thick walls and are short for a heat exchanger of a given heat output. Fourth, these tubes are rolled into or otherwise secured to the inlet header plate in such manner as to give good thermal conductivity between the header plate and the tubes. And, fifth, the inlet header plate and tubes are formed of a metal having a very high rate of thermal conductivity but not necessarily a high melting temperature. Silver, copper and aluminum are suitable for this purpose, but silver is not available because of its prohibitive price. Copper has a slightly better coefficient of heat conductivity than aluminum at low temperatures but at high temperatures aluminum has practically the same rate of thermal conductivity as copper. For aircraft heaters, aluminum is preferred because of its lighter weight.

In operation of the heater, the hot products of combustion play against the lower surface of the inlet header plate 46, as viewed in Fig. 1, and enter the tubes 50 thereby giving up a large quantity of heat to the lower surface of the header plate 46 and the inner surface of the tube walls.

The header plate 46 is thick and is in contact with the tubes over a considerable area, and since the header plate and tubes have a high rate of thermal conductivity, the larger portion of the heat absorbed by the header plate is transferred to the tubes. This large amount of heat conducted to the inlet ends of the tubes is then conducted longitudinally of the tubes very rapidly because of the heavy wall section of these tubes and because of the high rate of thermal conductivity of the aluminum of which the tubes are formed. Hot spots which might otherwise tend to develop are quickly leveled out by the thermal conduction through the header plate and tubes and the temperature gradient from the hottest portion of the header plate to the cooler or right hand ends of the tubes is comparatively low.

The heat transfer between the header plate and the tubes is facilitated by the rolling in of the tubes to provide good thermal conductivity between the header plate and tubes. In lieu of this rolling in, the tubes may be secured to the header plates in any other manner which will afford the desired heat conductivity between these elements. As an example of the temperature gradient of a typical heat exchanger embodying my invention, the hottest point on the surface of the inlet header plate 46 is 715° F., while the coolest point on this same plate is 505° F. The cool or outlet end of the heat exchange tubes 50 is approximately 308° F., while the temperature of the combustion gases striking the header plate is of the order of 3500° F. The foregoing temperature measurements were obtained in a small heater like that shown in the drawings and which is hereinafter described in more detail as Example No. 1.

The following examples of heat exchangers embodying applicant's invention are typical and represent only two of the many sizes of heat exchangers which can be made according to applicant's invention. Example No. 1 is a heat exchanger designed to give a heat output of 25,000 B. t. u.'s per hour when ram operated at moderate pressures:

The header plates are 4¼″ square, and are ¼″ thick.

The spacing between the inside surfaces of the header plates is 4″.

The heat exchange tubes are ¼″ outside diameter and have a wall thickness of .035″ so that the cross sectional area of the tube wall is approximately half the cross sectional area of the tube.

The tubes are spaced $\tfrac{1}{16}$″ apart throughout the heat exchanger, thus giving a total of 121 tubes.

The surface of these tubes exposed to the air, not counting the surface of the header plates, is 2.62 sq. ft., while the surface exposed to the gas is 2.2 sq. ft.

The total section of aluminum available for longitudinal conduction of heat through the tube walls is 2.84 sq. in. In other words, the tubes will conduct heat longitudinally as well as a bar of aluminum having a section of 2.84 sq. in. or approximately one-seventh the area of a header plate.

The heat exchanger weighs 1.82 lbs.

The total opening available for the passage for combustion gases is 3.33 sq. in. while the total available area for the passage of ventilating air is 3 sq. in.

The total area of the header which is exposed directly toward the combustion chamber is about 18 sq. in. Since each of the ¼-inch heat exchange tubes is inserted in the header plate through the entire ¼-inch thickness thereof, the total area of contact of the 121 tubes with the header is 23.75 sq. in., which considerably exceeds the area of the header exposed to the products of combustion and insures the efficient conduction of heat from the header plate to the tubes.

If it is desired to double the heat exchange rate of the foregoing heat exchanger, Example No. 1, the headers can be increased in size such that double the number of tubes are provided. These tubes can be of exactly the same length, although to decrease the pressure drop on the ventilating air side it may be preferable to make the tubes somewhat longer in larger heaters. In other words, the heat exchange rates goes up directly as the total inlet area of the tubes at the header plate is increased, whereas in a heat exchanger of the finned corrugated tube type, the heat exchange rate goes up directly with an increase in diameter and therefore as the square root of the increase in the cross sectional area of the heat exchanger, provided the length remains the same. This means that with the novel heat exchanger disclosed in this application extremely high heat exchange rates can be had with heat exchangers of comparatively small size, especialy in the high heat exchange brackets. This is not true of ordinary fire tube heaters for supplying heat to ventilating air, because the inner tubes receive considerable heat by radiation from the outer tubes and therefore run extremely hot. With applicant's heat exchanger, this effect is not present to any substantial extent because the high rate of thermal conductivity of the metal used in the tubes and the heavy metal sections of these tubes level out hot spots and reduce the surface temperatures of the tubes below the temperatures at which substantial radiation takes place.

Example No. 2 is a heat exchanger designed to have a heat output of 100,000 B. t. u.'s per hour operating under moderate ram pressure. This heat exchanger is similar in construction to the small heat exchanger, Example No. 1, except that the larger heat exchanger has 460 tubes, the header plates are 7½″ apart. the tubes are so arranged as to provide $\tfrac{1}{16}$″ spacing apart in one direction and $\tfrac{3}{32}$″ spacing in the other direction to give as great a concentration of tubes as possible in a given area, while providing wider spaces for the passage of ventilating air which flows through the heat exchanger in the direction of the passages provided by the $\tfrac{3}{32}$″ spacing. The tubes are of exactly the same diameter and wall thickness as in the small heat exchanger, and the header plates are also ¼″ thick. Each of these header plates is 8½″ square. The longitudinal conductivity area of the aluminum in the tubes is 10.7 sq. in. The ventilating air surface is 18½ sq. ft., while the surface confining the hot products of combustion is 13.7 sq. ft. The heat exchanger weighs 10.82 lbs. The total available opening for the passage of combustion gases is 12.3 sq. in., while the total available area for the passage of ventilating air is 32 sq. in.

The aluminum tubes are comparatively small in diameter and have a high rate of thermal conductivity, so that they act as a quite effective flame arrestor. If there is any flame propagation at all from the combustion chamber to the exhaust end of the heat exchanger, such propagation will be so slow that no appreciable explosion can take place in the heater. Furthermore, the exhaust manifold 50′ and the combustion chamber 40 are of comparatively small volume and the heat exchanger itself is so divided up that it cannot resonate effectively. The result of all these factors is that a heater of this type can be started and operated without a muffler, provided the exhaust connection is kept short, that is, not more than a few inches in length. A longer exhaust line forms a resonating column which will result in a low frequency rumble, which must be overcome by an acoustic chamber or other muffling means if a quiet heater is to be provided.

It will be noted from the foregoing examples that the wall portion of each tube 50 occupies almost exactly one-half the total cross sectional area of the tube as clearly indicated in Fig. 5. In some designs of heat exchangers, it may be advisable to have the wall section of the tube occupy more than one-half of the cross sectional area of the tube but in order to obtain the advantages of my invention it is inadvisable to make the wall section of the tube substantially less than one-half the total cross sectional area of the tube. In the examples described and shown in the drawing, the outlet header plate 48 is of the same thickness as the inlet header plate 46. The outlet header plate is not exposed to the same high temperature to which the inlet header plate is exposed and it is not essential that the outlet header plate be as thick as the inlet header plate. It is usually convenient, however, from a manufacturing standpoint, to make both header plates of the same thickness to afford interchangeability and also to permit the ends of the tubes 50 to be secured to both header plates by the same tools and machinery. In general, the tubes 50 should be placed as close together as possible to afford maximum cooling of the inlet header plate, but such spacing of the tubes must not unduly restrict the flow of ventilating air. It is also preferable to use more short tubes than a lesser number of long tubes and in this connection space requirements and available pressure drop of the ventilating air across the heat exchanger are controlling factors.

It is to be understood that my invention is not limited to the particular details shown and described but may assume numerous other forms, and that my invention includes all modifications, variations and equivalents coming within the appended claims.

I claim:

1. In an air heater, the combination of means forming a combustion chamber and a heat exchanger immediately adjacent said chamber for transferring heat from the hot products of combustion to a current of air in out-of-contact relation thereto, said heat exchanger comprising a pair of headers with tubes connecting them and forming conduits for said hot products of combustion, one header constituting one wall of the combustion chamber and having a surface exposed to said hot gases as they approach the tubes to flow longitudinally through them, said tubes being secured in said header in intimate contact therewith and being closely spaced, the total area of contact of said tubes with the header being at least equal to the total area of the header exposed toward the combustion chamber, said header and tubes being of a metal of high thermal conductivity and having a thick wall of cross sectional area approximately half the cross sectional area of the tube, whereby the heat absorbed by the header is rapidly transmitted to the tubes and distributed throughout the length of said tubes by conduction, and means directing a current of ventilating air across and between said tubes.

2. In an air heater as defined in claim 1, the spacing between the tubes transversely of the direction of air flow being substantially less than the outside diameter of each tube.

3. In an air heater as defined in claim 1, the spacing between the tubes in one direction being about one-fourth the diameter of each tube, and the spacing between said tubes in a direction perpendicular to the first direction being also about one-fourth of the diameter of each tube.

4. In an air heater as defined in claim 1, the thickness of said header being at least equal to the diameter of each tube and said tubes being fitted in intimate contact with the header throughout its thickness.

5. In an air heater as defined in claim 1, the spaces between the tubes available for air flow across them being approximately half the outer diameter of each, insuring intimate contact of the air therewith for efficient transfer of heat to said air.

6. In an air heater, the combination of means forming a combustion chamber and a heat exchanger immediately adjacent said chamber for transferring heat from the hot products of combustion to a current of air in out-of-contact relation thereto, said heat exchanger comprising a pair of headers with tubes connecting them and forming conduits for said hot products of combustion, one header constituting one wall of the combustion chamber and having a surface exposed to said hot gases as they approach the tubes to flow longitudinally through them, said tubes being secured in said header in intimate contact therewith and being closely spaced so that the total area of contact of said tubes with the header is at least equal to the total area of the header exposed toward the combustion chamber, said header and tubes being composed of metal having high thermal conductivity and said tubes having relatively thick walls which afford a total cross section for longitudinal conduction of heat in the tubes equal to about one-seventh of the total area of the header, whereby the heat absorbed by the header is rapidly transmitted to the tubes and distributed throughout the length of said tubes by conduction, and means directing a current of ventilating air across and between said tubes.

HENRY J. DE N. McCOLLUM.

REFERENCES CITED

The following references are of record in the file of this patent:

UNITED STATES PATENTS

| Number | Name | Date |
|--------|------|------|
| 323,957 | Pearce | Aug. 11, 1885 |
| 1,159,775 | Kerr | Nov. 9, 1915 |
| 1,194,977 | Edwards | Aug. 15, 1916 |
| 1,766,076 | Humphrey et al. | June 24, 1930 |
| 1,788,158 | Humphrey et al. | Jan. 6, 1931 |
| 2,001,953 | Blackmore | May 21, 1935 |
| 2,072,466 | Rohrer | Mar. 2, 1937 |
| 2,079,067 | Herbster | May 4, 1937 |
| 2,190,410 | Mallory | Feb. 13, 1940 |